US006677414B2

(12) United States Patent
Hintzer et al.

(10) Patent No.: US 6,677,414 B2
(45) Date of Patent: Jan. 13, 2004

(54) AQUEOUS EMULSION POLYMERIZATION PROCESS FOR THE MANUFACTURING OF FLUOROPOLYMERS

(75) Inventors: Klaus Hintzer, Woodbury, MN (US); Gernot Löhr, Burgkirchen (DE); Franz März, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/009,758

(22) PCT Filed: Dec. 22, 2000

(86) PCT No.: PCT/US00/35105

§ 371 (c)(1),
(2), (4) Date: Dec. 11, 2001

(87) PCT Pub. No.: WO01/49752

PCT Pub. Date: Jul. 12, 2001

(65) Prior Publication Data

US 2003/0032748 A1 Feb. 13, 2003

(30) Foreign Application Priority Data

Dec. 30, 1999 (DE) .......................... 199 64 004

(51) Int. Cl.$^7$ ................................. C08F 2/00
(52) U.S. Cl. .................. 526/206; 526/247; 526/249; 526/253; 526/255
(58) Field of Search ................. 526/247, 206, 526/249, 253, 255

(56) References Cited

U.S. PATENT DOCUMENTS

| 4,864,006 A | 9/1989 | Giannetti et al. ........... 526/209 |
| 5,301,254 A | 4/1994 | Blickle et al. .............. 385/143 |
| 5,608,022 A | 3/1997 | Nakayama et al. ......... 526/212 |

FOREIGN PATENT DOCUMENTS

| EP | 0 185 241 A | 6/1986 |
| EP | 0 219 065 A | 4/1987 |
| EP | 0 250 767 A | 7/1988 |
| EP | 0 816 397 A | 1/1998 |

OTHER PUBLICATIONS

Sax, "Hawley's Condensed Chemical Dictionary" 11th Ed., (1987), 461, Van Nostrand Reinhold, (New York).*

* cited by examiner

*Primary Examiner*—Helen L. Pezzuto
(74) *Attorney, Agent, or Firm*—Dean M. Harts

(57) ABSTRACT

Emulsion polymerization of liquid fluorinated monomers which have a boiling point above 50° C. and low water-solubility is markedly more efficient if the monomer is pre-emulsified with a nontelogenic fluorinated emulsifier in water.

18 Claims, No Drawings

AQUEOUS EMULSION POLYMERIZATION PROCESS FOR THE MANUFACTURING OF FLUOROPOLYMERS

FIELD OF THE INVENTION

The present invention relates to the aqueous emulsion polymerization of fluorinated monomers to produce fluoropolymers. In particular, the present invention relates to the aqueous emulsion polymerization involving liquid fluorinated monomers which have a boiling point of at least 50° C.

BACKGROUND OF THE INVENTION

Aqueous emulsion polymerization is a well-known method for making fluoropolymers, i.e. polymers of which the carbons in the backbone of the polymer have fluorine atoms attached to them. Generally, the amount of fluorination of the backbone of fluoropolymers will be at least 40% by weight, preferably at least 50% by weight. Fluoropolymers which have fully fluorinated backbones are called perfluoropolymers.

The fluoropolymers are generally produced by (co)polymerization of gaseous fluorinated monomers, in particular fluorinated olefins such as tetrafluoroethylene (TFE) hexafluoropropylene (HFP), vinyl fluoride, vinylidene fluoride (VDF) or chloro-trifluoroethylene (CTFE).

To obtain certain desired properties, it is known to copolymerise the aforementioned gaseous fluorinated olefins with monomers such as fluoro alkenyl ethers which include fluoro vinyl ethers and fluoro allyl ethers. Fluoro alkenyl ethers that have a high boiling point of 50° C. or more have a low vapor pressure at typical polymerization temperatures of 20° C. to 100° C. Additionally, they have an extremely low water solubility. As a result it has proven difficult to incorporate these liquid comonomers into fluoropolymers at larger levels as may be desired for certain applications. Incorporating large amounts of such comonomers is of particular value for producing elastomers that have a low Tg. When one wants to improve the amount incorporated of such monomers by increasing the polymerization temperature, that also increases the likelihood of undesired chain transfer reactions which impair the possibility of obtaining high molecular weight. On the other hand, polymerization at low temperature reduces the rate of polymerization making the process economically less attractive.

EP 219065 discloses an aqueous free radical emulsion polymerization of perfluoro vinyl ethers of the formula $CF_2=CF-O-(CF_2CFXO)_m-R_f$ wherein X is F or $CF_3$, m is 1 to 5 and $R_f$ is a $C_1-C_6$ perfluoroalkyl group. EP 219065 discloses the use of carboxylate terminated perfluoropolyether emulsifiers for conducting the polymerization. However, in the examples of this EP-patent, fairly large amounts of the emulsifier are used, typically about 10% by weight based on the aqueous phase. Such high emulsifier concentrations usually lead to a so-called micro-emulsion polymerization which typically results in polymer particles of considerably less than 100 nm.

EP 250767 discloses an aqueous free radical emulsion polymerization involving for example perfluoroalkyl perfluorovinyl ether monomers by using a microemulsion of a perfluoropolyether with polyether based emulsifiers. This microemulsion is taught to have droplet sizes of less than 200 nm. The microemulsion is added to the polymerization medium at the beginning of the polymerization. The resulting particle sizes of the polymer particles obtained is very small, e.g. 40 nm, which is evidence that the polymerization occurs via microemulsion polymerization. Thus, the number of polymer particles per liter is increased by an order of magnitude. Therefore, the polymerization rate is considerably increased. However, EP 250767 does not describe pre-emulsification of liquid polymerizable fluorinated monomers like perfluoroalkyl perfluorovinyl ether monomers.

EP 816397 discloses the use of similar microemulsions of perfluoropolyethers with polyether based emulsifiers for the aqueous emulsion polymerization of vinylidene fluoride (VDF). As disclosed, the obtained latex particles have a very small size (apparently well below 100 nm) and likewise an increase of the polymerization rate is found. The polymerization here therefore evidently also occurs via microemulsion polymerization.

U.S. Pat. No. 4,864,006 also discloses the use of perfluoropolyethers microemulsified in perfluoroether-based emulsifiers at the aqueous emulsion polymerization of fluorinated monomers. All of these processes lead to microemulsion polymerizations characterized by an increased polymerization rate due to the observed small particle size, considerably lower than 100 nm.

The perfluoropolyether emulsifiers have the disadvantage that they have high boiling points and are difficult to remove from the polymer resin. Residual emulsifiers can have an adverse effect on the processing properties and the properties of the final product, for example lead to discoloration during work-up or processing, or to bleed-out during long-term use of the final product.

U.S. Pat. No. 5,608,022 teaches the aqueous emulsion polymerization of sulfonyl fluoride or carboxylic acid ester containing fluorinated vinyl ethers wherein the so-called functionalized vinyl ether monomer is pre-emulsified. According to Example 1 of this US-patent, the droplet size of the monomer droplets in the emulsion is 550 nm.

It would be desirable to find an improved aqueous emulsion polymerization process that allows for effective incorporation of large amounts of highly boiling fluorinated monomers. Desirably, the polymerization reaction should proceed at a high speed allowing for a more cost effective production of such fluoropolymers. The process desirably may be run using low emulsifier levels and using emulsifiers that can be readily removed from the resulting polymerization product.

SUMMARY OF THE INVENTION

The present invention provides a method of preparing a fluorinated polymer including repeating units derived from a liquid fluorinated monomer having a boiling point of at least 50° C. and selected from the group consisting of fluorinated olefins, fluorinated allyl ethers and fluorinated vinyl ethers that do not contain hydrolysable groups that upon hydrolysation yield ionic groups, the method comprising the steps of:

pre-emulsifying said liquid fluorinated monomer in water with the aid of a fluorinated emulsifier to obtain an aqueous emulsion of said fluorinated monomer; and polymerizing a thus obtained emulsified fluorinated monomer.

Preferably the pre-emulsified liquid fluorinated monomer is copolymerized with one or more gaseous fluorinated monomers.

By the term "liquid fluorinated monomer" is meant that the monomer is generally present as a liquid at ambient conditions of temperature and pressure, i.e. at a temperature of 20° C. and a pressure of 1 atm. By the term "pre-emulsified" in connection with the present invention is meant that the fluorinated monomer is emulsified in water with the aid of the fluorinated emulsifier prior to polymerization of the liquid fluorinated monomer. The term aqueous emulsion is to be understood as a liquid emulsified in water that generally has a milky appearance generally having a settling time of at least 1 hour. Such settling time is generally achieved using a fluorinated emulsifier (preferably a non-telogenic emulsifier) other than a fluorinated polyether emulsifier. By the term "boiling point" in connection with the present invention is meant a boiling point under ambient conditions, i.e. at a pressure of about 1 atm. By the term "gaseous" in connection with the present invention is meant that the respective compounds are present as a gas under ambient conditions of temperature and pressure, i.e. at a temperature of about 20° C. and a pressure of about 1 atm. The fluorinated vinyl ether should be free of hydrolysable groups that upon hydrolysation yield ionic groups, in particular the fluorinated vinyl ether should not contain hydrolysable groups such as esters and $SO_2F$. The fluorinated vinyl ether may contain substituents like chlorine, bromine and iodine, fluorinated alkyl groups, fluorinated alkoxy groups and fluorinated polyether functions.

It was found that when the liquid fluorinated monomer was emulsified prior to its copolymerization with gaseous fluorinated monomers, the polymerization time could be reduced and high levels of the liquid fluorinated monomer could be readily copolymerized. In particular, the process of the invention allows for the production of fluoropolymers having at least 1% by weight of repeating units derived from the pre-emulsified fluorinated monomer, preferably at least 5% by weight and more preferably at least 10% by weight. The process of the invention also makes it possible to produce homopolymers of the pre-emulsified liquid fluorinated monomer. Also, commonly employed fluorinated emulsifiers that can be readily removed subsequent to polymerization can be used and they can be used in fairly low levels, typically of about 0.1% by weight to 1% by weight relative to the amount of water.

DETAILED DESCRIPTION OF THE INVENTION

In accordance with the process of the present invention, the fluorinated monomer is emulsified in water with the aid of a fluorinated emulsifier prior to its polymerization or copolymerization with the gaseous fluorinated monomers. The pre-emulsification of the liquid fluorinated monomer preferably results in an emulsion having monomer droplets of an average diameter of 1 μm or more, typically it is expected in the range of 1 to 20 μm. The aqueous emulsion should preferably have a pot life (settling time) of at least 1 hour, more preferably at least 3 hours. The pot life or settling time is defined as the time required for 10% by weight of the monomer droplets to settle or separate out of the aqueous emulsion.

Aqueous emulsions of the liquid fluorinated monomer can conveniently be obtained by suitable emulsification equipment such as for example a dispersing device such as Ultra-Turrax. The stirring rates should be sufficiently high to achieve the desired degree of emulsification and stability. Generally, stirring rates of 24 000 rpm or more can be employed. According to indication of the supplier of the Ultra-Turrax device, the resulting emulsions would have an average droplet size of 1 to 10 μm. Air is preferably excluded during the emulsification.

Fluorinated emulsifiers for preparing the aqueous emulsion of the liquid fluorinated monomer are preferably non-telogenic emulsifiers. Examples of fluorinated emulsifiers include salts, in particular ammonium salts of linear or branched perfluoro alkyl carboxylic and sulphonic acids having 6 to 11 carbon atoms in the alkyl chain. It was found that salts of branched perfluoroalkyl carboxylic and sulphonic acids are more effective than their linear counter parts. Specific examples include perfluorooctanoic acid ammonium salt (APFOA) and $C_8F_{17}SO_3Li$. Commercially available fluorinated emulsifiers that can be used include $C_8F_{17}SO_3Li$ available as FT 208 from Bayer AG, and $C_8F_{17}SO_2N(C_2H_5)CH_2COOK$ available from 3M as FC 128.

APFOA is the preferred emulsifier as it can be more readily removed from the polymerization product at the end of polymerization. Typically, APFOA is very volatile and decomposes at temperatures of 180° C. or more leading to volatile products. Therefore, APFOA type of emulsifiers can be easily removed during work-up of the fluoropolymers.

The pot life of the aqueous emulsion of the liquid fluorinated monomer can be increased by increasing the pH. For example, with APFOA, the pot life can be increased to 50 hours or more at a pH of 7 or more. Typically, the pH of the aqueous emulsion can be increased by adding ammonia or alkali metal hydroxides.

The amount of fluorinated emulsifier used to emulsify the liquid fluorinated monomer is generally between 0.1 and 1% by weight based on the weight of the water phase. Although higher amounts of emulsifier can be used, they will not necessarily lead to a significant increased pot life of the aqueous emulsion.

The aqueous emulsion of the liquid fluorinated monomer may include a mixture of liquid fluorinated monomers and may further comprise other monomers such as other poorly water soluble and liquid monomers. Additional emulsifier may be added and if added, they are preferably identical to the emulsifier(s) used to pre-emulsify the liquid fluorinated monomer. Advantageously, APFOA is used in the emulsification of the liquid fluorinated monomer and in the subsequent aqueous emulsion polymerization.

The pre-emulsification of the liquid fluorinated monomer may proceed in a separate vessel from the polymerization vessel, in the polymerization vessel itself prior to commencing the polymerization or in the monomer supply line to the polymerization vessel.

The aqueous emulsion polymerization can be carried out continuously in which, for example, the aqueous emulsion of the liquid fluorinated monomer and other monomers, water, optionally further emulsifiers, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomers and emulsified liquid fluorinated monomer into the reactor to maintain a constant pressure until a desired amount of polymer is formed. The polymerization can be carried out in a standard or conventional vessel used for emulsion polymerization of gaseous fluorinated monomers.

For the free-radical polymerization use may be made of any suitable initiator or any suitable initiator system, for example ammonium persulfate (APS), or of redox systems, such as APS/bisulfite and potassium permanganate. If oil-soluble initiators are used in the polymerization, it is generally preferred for these to be mixed with the aqueous emulsion of the liquid fluorinated monomer. For the purposes of the present invention, oil-soluble initiators are those which have no, or only insufficient, solubility in water. Examples of oil-soluble initiators are substituted dibenzoyl peroxides and cumene hydroperoxides, in particular bisperfluoropropionyl peroxide.

The polymerization systems may comprise auxiliaries, such as buffers and, if desired, emulsifiers, complex-formers or chain-transfer agents. The polymerization temperature may be from 10 to 100° C. Polymerization pressures may be from 3 to 30 bar.

The achievable solids content of the polymer dispersion is typically from 10 to 35% without any major coagulation. Surprisingly, the resultant dispersions are highly stable despite the observed unusually large particle diameters of up to 400 nm. The particle size of polytetrafluoroethylene (PTFE) born via standard emulsion polymerization do not exceed 250 nm, larger particle size result in coagulation of the PTFE at polymerization conditions; the particle size of fluoroelastomers and thermoplasts born in standard emulsion polymerization usually do not exceed 200 nm. The large particle size observed is believed to be due to the emulsion polymerization occurring partially via a so-called monomer-droplet polymerization.

The production of fluoropolymers via aqueous emulsion polymerization generally produces considerable amounts of industrial wastewater as a consequence of necessary washing processes during the isolation of the resins from the polymer dispersion. The wastewater generally comprises about 90% of the emulsifier used. Since the emulsifier makes a considerable contribution to production costs, it is preferably recovered and recycled from the wastewater, using a process as disclosed in German Patent Application 199 53 285.0.

The aqueous emulsion polymerization process of the present invention can be used for the polymerization of liquid fluorinated monomers that have a boiling point of at least 50° C. and that are selected from the group consisting of fluorinated olefins, fluorinated allyl ethers and fluorinated vinyl ethers that do not contain hydrolysable groups capable of yielding ionic groups when hydrolysed. The liquid fluorinated monomer may be fully or partially fluorinated, i.e. one or more fluorine atoms may be replaced by iodine, bromine, chlorine or hydrogen. However, when the liquid fluorinated monomer is partially fluorinated, the molar ratio of fluorine to non-fluorine atoms or groups should generally be at least 4. Examples of liquid fluoroolefins include partially and fully fluorinated olefins having a boiling point of at least 50° C. Specific examples include perfluoroalkyl vinyl monomers having 6 or more carbons in the perfluoroalkyl chain such as $C_6F_{13}$—CH=$CH_2$.

The process of the invention may further be used to polymerize liquid fluorinated allyl ethers which are fluorine compounds that have at least one ether bridge and one terminal double bond, with the oxygen in β-position with respect to the double bond. Examples of fluorinated allyl ethers include those that are fully as well as those that are partially fluorinated. Examples of fluorinated allyl ethers are those that correspond to the formula:

  (I)

wherein $R_f$ represents a linear or branched perfluoroalkyl group which may contain one or more ether linkages. A specific example of a liquid fluorinated allyl ether according to formula (I) is $CF_3$—O—$(CF_2)_2$—O—$CF_2$—CF=$CF_2$ (boiling point 67° C.).

Preferably, the liquid fluorinated monomer for use in the invention is a fluorinated vinyl ether. Generally, the fluorinated vinyl ether is a perfluoro vinyl ether. Typically, the fluorinated vinyl ether is a perfluorinated vinyl ether corresponding to formula (II):

  (II)

wherein $R_f$ and $R'_f$ are different linear or branched perfluoroalkylene groups of 2–6 carbon atoms, m and n are independently 0–10 and the sum of n and m is at least 1, and $R''_f$ is a perfluoroalkyl group of 1–6 carbon atoms.

Examples of fluoro vinyl ethers of formula (II) include compounds of the formula (III):

  (III)

where $R''_f$ is a perfluoroalkyl group having 1–6 carbon atoms, n=1–5, and Z=F or $CF_3$. Examples of compounds of formula (III) include those in which $R''_f$ is $C_3F_7$, n=1, Z=F or $CF_3$ and $CF_3$—O—$CF(CF_3)$—$CF_2$—$CF_2$—O—CF=$CF_2$ (boiling point 85° C.). Further useful fluorinated vinyl ethers included in formula (II) correspond to the formula (IV):

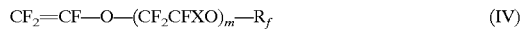  (IV)

in which m represents an integer of 1 to 5, X is F or $CF_3$ and $R_f$ is a $C_1$–$C_5$ perfluoroalkyl group. Examples of monomers of formula (IV) include those where X is $CF_3$ and $R_f$ is perfluoro n-propyl and wherein m is 1 (boiling point of 103° C.) or m is 2 (boiling point of 160° C.).

Additional perfluoro vinyl ether monomers useful in the invention include compounds of the formula

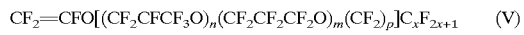  (V)

where m and n=1–10, p=0–3, and x=1–5. Preferred members of this class include compounds where n=1, m=1, and x=1.

Still further examples of perfluoro vinyl ethers include ethers corresponding to formula (VI):

  (VI)

where n=1–5, m=1–3, and where, preferably, n=1.

Copolymerization of perfluorinated vinyl ether monomers such as set forth above with gaseous fluorinated monomers such as TFE, results in polymers with considerably improved properties. When incorporated at low levels, typically less than 10% by weight, fluorinated thermoplastics with improved properties can be obtained. Fluoroelastomers with desirable properties can be produced by copolymerizing substantial amounts of fluorovinyl ethers with gaseous fluorinated monomers. In particular the low-temperature properties of the final product can be improved by incorporating high levels of the liquid fluorinated vinyl ether monomer into the fluoropolymer. Typically, the amount of repeating units derived from such fluorovinyl ethers, for example those according to formula (II) above, will be between 15 mol % and 50 mol %. Such fluoropolymers will have a glass transition temperature (Tg) that is, for example, as low as −40° C.

Especially useful fluoro vinyl ethers for making fluoroelastomers with a low Tg are those that have linear perfluoro groups attached to the vinyl of the fluoro vinyl ether, such as monomers according to formula (III) in which X is F. A highly preferred monomer for making fluoroelastomer is $CF_3$—O—$(CF_2)_3$—O—CF=$CF_2$ (boiling point of 64° C.).

The preparation of vinyl/allyl ethers is generally expensive and has been described in DE-A-22 15 401. The process of the invention allows for the effective incorporation of these monomers into fluoropolymers without substantial waste of these expensive monomers.

To manufacture fluoropolymers and preferably perfluoropolymers by the process of the present invention, the liquid fluorinated monomers are generally copolymerized with gaseous fluorinated monomers, in particular gaseous fluorinated olefins. Examples of gaseous fluorinated monomers for copolymerization with the liquid fluorinated monomers include tetrafluoroethylene (TFE) hexafluoropropylene (HFP), vinyl fluoride, vinylidene fluoride (VDF), chlorotrifluoroethylene (CTFE) and mixtures thereof. Additionally, the copolymerization may involve non-fluorinated gaseous monomers such as ethylene and propylene.

Generally, the amount of repeating units derived from the gaseous fluorinated monomers in the fluoropolymer will be at least 20% by weight, preferably at least 40% by weight. A typical amount of repeating units derived from gaseous fluorinated monomers is between 50% by weight and 95% by weight.

Various modifications and alterations of this invention will become apparent to those skilled in the art without departing from the scope and spirit of the present invention, and it should be understood that this invention is not to be unduly limited to the illustrative embodiments set forth herein.

The invention will now be further illustrated with reference to the following examples without however intending to limit the invention thereoto.

EXAMPLES

List of Abbreviations Used in the Examples:
APFOA Ammonium salt of perfluorooctanoic acid
APS Ammonium persulfate
TFE Tetrafluoroethylene
VDF Vinylidene fluoride
PF-3: $CF_3$—O—$(CF_2)_3$—O—CF=$CF_2$ boiling point 64° C.
PF-4: $CF_3$—O—CF($CF_3$)—$CF_2CF_2$—O—CF=$CF_2$ boiling point 85° C.
PF-5: $CF_3$—O—$CF_2$—$CF_2$—O—$CF_2$—CF=$CF_2$ boiling point 67° C.
PPVE-2: $CF_2$=CF—O—$CF_2$—CF($CF_3$)—O—$CF_2$—$CF_2$—$CF_3$ boiling point 103° C.

Test Methods:
Determination of physical parameters: the comonomer content of the copolymer is measured using $^1$H NMR and $^{19}$F NMR. Acetone and, respectively, hexafluorobenzene are used as solvent. The glass transition temperature is determined by differential thermal analysis (DSC), and the particle size is determined by elastic light scattering.

Comparative Example 1

A 4 l vessel which has been equipped with an impeller agitator is charged with 2.8 l of deionized water which comprises 5 g of APFOA and 9 g of $K_2HPO_4$ and heated to 70° C., and atmospheric oxygen is removed by alternating nitrogen-flushing with evacuation. 454 g of PVVE-2, deaerated by nitrogen-flushing, are then charged to the vessel and the pressure is brought to 9.0 bar using 48 g of TFE and 71 g of VDF. The stirring rate is 320 rpm. The polymerization is initiated by rapidly feeding 3 g of APS dissolved in 15 ml of water. The polymerization is maintained at constant pressure and temperature for 2 hours, continuously feeding 434 g of PPVE-2. The pressure is held constant by introducing TFE and VDF in a ratio of 1:1.9 by weight. A micromotion measurement device is used to measure the take-up rate of the gaseous monomers. After the desired polymerization time, the gaseous monomers are drawn off. The reactor is cooled to room temperature and its contents discharged. The polymerization is terminated by ceasing monomer supply and aerating the vessel. The discharged vessel contents divide into two layers. The lower layer is unconverted PPVE-2 (762 g). The upper layer comprises 332 g of copolymer composed of 31 mol % of TFE, 68 mol % of VDF and 0.7 mol % of PPVE-2. Only 14.5% of the PPVE-2 used was incorporated into the polymer.

Comparative Examples 2 to 5

In studies on a variety of copolymerization systems, the reaction conditions and procedure were varied from Comparative Example 1 only in respect of the conditions listed in Table 1a. The findings are given in Table 1b.

Examples 1 to 6

These are examples according to the invention in which the liquid fluorinated monomer (liquid monomer) was pre-emulsified, i.e. emulsified prior to its polymerization. 500 g of PPVE-2 and 780 g of deionized water which comprises 5 g of APFOA (tradename FX 1006, supplied by 3M) are charged to a glass container which has been equipped with a dispersing device ("Ultra-Turrax", IKA Turrax T 25 S 25 N 18 G). The contents are flushed with nitrogen.

The pH is adjusted to 7.0 using ammonia. The 2-phase mixture is stirred for 30 seconds at 24,000 rpm. This gives a milky emulsion with a pot life ≧3 h. The pre-emulsified liquid fluorinated monomer is metered in and also, where appropriate, used as a subsequent feed.

The same 4 l vessel is utilized, with the same stirring conditions. The reaction conditions are given in Table 2a and the findings in Table 2b. The pre-emulsification utilizes the amount of emulsifier given in the table, and this is the total amount utilized in the polymerization. The pre-emulsified monomer is fed continuously at a constant rate over the polymerization time given in Table 2a. No lower phase is observed in any of the examples shown. The liquid monomer is incorporated practically quantitatively into the polymer. The glass transition temperature of the copolymer prepared according to the invention is also given in Table 2b.

Example 6

Homopolymerization of PPVE-2

500 g of PPVE-2 are pre-emulsified under nitrogen with 740 g of water in which 30 g of FT 208 have been dissolved as fluorinated emulsifier. The homopolymerization is carried out in a 4 l vessel in which there are 1460 g of water.

The vessel contents are freed from air by repeated evacuation and nitrogen-flushing, heated to 70° C. and brought to 1.2 bar using nitrogen. The pre-emulsified liquid fluorinated monomer is then pumped into the vessel, and the polymerization initiated by feeding 4 g of APS, dissolved in 150 g of water. After 5 hours the polymerization is terminated by cooling the contents of the vessel to room temperature. This gives 2895 g of a milky dispersion with a solids content of 8.5%, corresponding to 240 g of polymer. NMR analysis shows that the polymer is a PPVE-2 homopolymer.

TABLE 1a

Reaction conditions for the copolymerization systems without pre-emulsification:
Polymerization temperature: 70° C.
Polymerization pressure: 9 bar
Initiator: APS
Emulsifier: APFOA
Buffer: 9 g of $K_2HPO_4$

| Comparative Ex. No. | Liquid monomer | Amount of liquid monomer [g] | | Gaseous comonomers | Weight ratio between gaseous monomers | | APS [g] | APFOA [g] | Reaction time [h] |
|---|---|---|---|---|---|---|---|---|---|
| | | Initial charge | Subsequent Feed | | Initial charge | Subsequent feed | | | |
| 2 | PPVE-2 | 500 | — | TFE | 139 g | 107 g | 0.05 | 13.5 | 0.6 |
| 3 | PF-3 | 266 | 200 | TFE/VDF | 1:1.4 | 1:1.95 | 9.0 | 9.0 | 1.55 |
| 4 | PF-4 | 346 | 386 | TFE/VDF | 1:1.4 | 1:1.95 | 9.0 | 9.0 | 3.5 |
| 5*) | PF-5 | 133 | 218 | TFE/VDF | 1:2.35 | 1:1.66 | 4.5 | 12.0**) | 1.3 |

*)no buffer
**)perfluorooctyllithium sulfonate [$C_8F_{17}SO_3Li$; FT 208 (Bayer AG)] is utilized instead of APFOA

TABLE 1b

Experimental findings

| Comparative Example No. | Amount of lower phase [g] | Percentage of unconverted liquid monomer | Amount of copolymer in upper phase | Composition of copolymer in mol % TFE/VDF/MF*) |
|---|---|---|---|---|
| 2 | 397 | 79 | 209 | not determined |
| 3 | 202 | 43 | 452 | 28/59/13 |
| 4 | 590 | 80 | 434 | 30/62/7 |
| 5 | 192 | 55 | 740 | 7/81/12 |

*)MF = liquid monomer

TABLE 2a

Reaction conditions for the copolymerization systems with pre-emulsification of the liquid fluorinated monomer (PPVE-2):
Polymerization pressure: 9 bar
Initiator: APS
Emulsifier: APFOA
Buffer: 9 g of $K_2HPO_4$

| Ex. No. | Liquid monomer | Amount of liquid monomer [g] | | Gaseous comonomers | Weight ratio Between gaseous monomers | | APFOA [g] | APS [g] | React. temp. [° C.] | React. time [h] |
|---|---|---|---|---|---|---|---|---|---|---|
| | | Initial charge | Subs. Feed | | Initial charge | Subs. Feed | | | | |
| 1 | PPVE-2 | 300 | 490 | TFE/VDF | 1:1.5 | 1:2.0 | 9*) | 0.5 | 70 | 2.5 |
| 2 | PPVE-2 | 500 | — | TFE | 113 g | 141 g | 4.5 | 1 | 70 | 1.0 |
| 3 | PF-3 | 290 | 290 | TFE/VDF | 1:1.42 | 1:1.85 | 9 | 9 | 60 | 3.0 |
| 4 | PF-4 | 250 | 330 | TFE/VDF | 1:1.42 | 1:2.2 | 9 | 9 | 60 | 2.9 |
| 5 | PF-5 | 133 | 217 | TFE/VDF | 1:2.4 | 1:1.66 | 12*) | 4.5 | 60 | 1.7 |

*)FT 208 (Bayer AG), the lithium salt of perfluorooctyl sulfonic acid, is used instead of APFOA.

TABLE 2b

Experimental findings

| Ex. No. | Amount of dispersion [kg] | Solids content [%] | Composition of copolymer (mol %) TFE/VDF/MF*) | Glass transition temperature [° C.] |
|---|---|---|---|---|
| 1 | 4.0 | 24.9 | 16/57/27 | −30 |
| 2 | 3.55 | 13.0 | 80/0/20 | −6 |
| 3 | 3.86 | 24.3 | 19/57/24 | −40 |
| 4 | 3.83 | 24.8 | 24/55/22 | −30 |
| 5 | 3.85 | 27.1 | 21/68/10 | −35 |

*)MF: Liquid monomer
the particle sizes of the polymer particles are >300 nm

What is claimed is:

1. Method of preparing fluorinated polymers including repeating units derived from a liquid flourinated monomer that has a boiling point of at least 50° C. and is selected from the group consisting of fluorinated olefins, fluorinated allyl ethers and fluorinated vinyl ethers that do not contain hydrolysable groups that upon hydrolysation yield ionic groups, the method comprising the steps of:

pre-emulsifying said liquid fluorinated monomer in water with the aid of a fluorinated emulsifier other than a fluorinated ether emulsifier to obtain an aqueous emulsion of said fluorinated monomer; and polymerising a thus obtained emulsified liquid fluorinated monomer.

2. Method according to claim 1 wherein said fluorinated vinyl ethers are optionally substituted with a substituent selected from the group consisting of hydrogen, chlorine, bromine and iodine.

3. Method according to claim 1 wherein said emulsified liquid fluorinated monomer is copolymerized with one or more gaseous fluorinated monomers.

4. Method according to claim 1 wherein said fluorinated emulsifier is a non-telogenic emulsifier.

5. Method according to claim 3 wherein the gaseous fluorinated monomer is selected from the group consisting of tetrafluoroethylene, hexafluoropropylene, vinyl fluoride, vinylidene fluoride, chlorotrifluoroethylene and mixtures thereof.

6. Method according to claim 3 wherein said preemulsified liquid fluorinated monomer is further copolymerized with one or more non-fluorinated olefinic monomer.

7. Method according to claim 6 wherein said non-fluorinated olefinic monomer is selected from the group consisting of ethylene and propylene.

8. Method according to claim 1 wherein the fluoropolymer prepared has at least 1% by weight of repeating units derived from said liquid fluorinated monomer.

9. Method according to claim 1 wherein the fluoropolymer prepared has at least 40% by weight of repeating units derived from said gaseous fluorinated monomers.

10. Method according to claim 1 wherein said aqueous emulsion has a settling time of at least 1 hour.

11. Method according to claim 1 wherein said liquid fluorinated monomer is a perfluorinated vinyl ether corresponding to the formula:

$$CF_2=CFO(R_fO)_n(R'_fO)_mR''_f$$

wherein $R_f$ and $R'_f$ are different linear or branched perfluoroalkylene groups of 2–6 carbon atoms, m and n are independently 0–10 and the sum of n and m is at least 1, and $R''_f$ is a perfluoroalkyl group of 1–6 carbon atoms.

12. Method according to claim 11 wherein said perfluorinated vinyl ether corresponds to the formula:

$$CF_2=CF-O-(CF_2)_3-O-R_f''$$

wherein $R_f''$ is a perfluoroalkyl group having 1 to 6 carbon atoms.

13. A method of preparing fluorinated polymers including repeating units derived from a liquid fluorinated monomer that has a boiling point of at least 50° C. and is selected from the group consisting of fluorinated olefins, fluorinated allyl ethers and fluorinated vinyl ethers that do not contain hydrolysable groups that upon hydrolysation yield ionic groups, the method comprising the steps of:

pre-emulisifying said liquid fluorinated monomer in water with the aid of a fluorinated emulsifier wherein said fluorinated emulsifier is a salt of a non-telogenic fluorinated alkanoic or alkylsulfonic acid, to obtain an aqueous emulsion of said fluorinated monomer; and polymerising a thus obtained emulsified liquid fluorinated monomer.

14. A method of preparing fluorinated polymers including repeating units derived from a liquid fluorinated monomer that has a boiling point of at least 50° C. and is selected from the group consisting of fluorinated olefins, fluorinated allyl ethers and fluorinated vinyl ethers that do not contain hydrolysable groups that upon hydrolysation yield ionic groups, the method comprising the steps of:

pre-emulsifying said liquid fluorinated emulsifier is a salt of a linear or branched perfluoroalkyl carboxylic acid, to obtain an aqueous emulsion of said fluorinated monomer; and polymerising a thus obtained emulsified liquid fluorinated monomer.

15. Method according to claim 14 wherein said fluorinated emulsifier is an ammonium salt of a linear or branched perfluoroakyl carboxylic acid.

16. Method according to claim 14 wherein said fluorinated emulsifier is an alkali salt of a linear or branched perfluoroalkyl carboxylic acid.

17. Method according to claim 13 wherein said fluorinated emulsifier is an ammonium salt of a linear or branched perfluoroalkyl sulfonic acid.

18. Method according to claim 13 wherein said fluorinated emulsifier is an alkali salt of a linear or branched perfluoroalkyl sulfonic acid.

* * * * *

UNITED STATES PATENT AND TRADEMARK OFFICE
CERTIFICATE OF CORRECTION

PATENT NO. : 6,677,414 B2  
DATED : January 13, 2004  
INVENTOR(S) : Hintzer, Klaus Page 1 of 1

It is certified that error appears in the above-identified patent and that said Letters Patent is hereby corrected as shown below:

<u>Column 12,</u>  
Line 39, after the words "pre-emulsifying said liquid fluorinated" insert the following -- monomer in water with the aid of a fluorinated emulsifier wherein said fluorinated --

Signed and Sealed this

Eighteenth Day of May, 2004

JON W. DUDAS  
*Acting Director of the United States Patent and Trademark Office*